US007934658B1

(12) United States Patent
Bhatti et al.

(10) Patent No.: US 7,934,658 B1
(45) Date of Patent: May 3, 2011

(54) METHOD AND APPARATUS FOR ACHIEVING A TAILORED CONTENT RESPONSE BASED UPON A PRODUCT IDENTIFIER COUPLED WITH A USER IDENTIFIER

(75) Inventors: Nina Trappe Bhatti, Mountain View, CA (US); Nicholas P. Lyons, Sunnyvale, CA (US); John Charles Schettino, Jr., San Jose, CA (US)

(73) Assignee: Hewlett-Packard Development Company, L. P., Houston, TX (US)

( * ) Notice: Subject to any disclaimer, the term of this patent is extended or adjusted under 35 U.S.C. 154(b) by 716 days.

(21) Appl. No.: 11/144,875

(22) Filed: Jun. 3, 2005

Related U.S. Application Data

(63) Continuation-in-part of application No. 11/047,302, filed on Jan. 31, 2005, and a continuation-in-part of application No. 11/047,016, filed on Jan. 31, 2005, and a continuation-in-part of application No. 11/017,768, filed on Dec. 22, 2004, and a continuation-in-part of application No. 11/017,772, filed on Dec. 22, 2004.

(51) Int. Cl.
*G06K 9/22* (2006.01)

(52) U.S. Cl. ......... 235/462.45; 235/462.46; 235/472.02; 705/20; 705/23

(58) Field of Classification Search ............. 235/462.45, 235/462.46, 472.02; 705/20, 23
See application file for complete search history.

(56) References Cited

U.S. PATENT DOCUMENTS

| | | | | |
|---|---|---|---|---|
| 6,129,274 A * | 10/2000 | Suzuki | ........................ | 235/381 |
| 6,179,206 B1 * | 1/2001 | Matsumori | ................... | 235/383 |
| 6,199,753 B1 * | 3/2001 | Tracy et al. | ................... | 235/375 |
| 7,080,041 B2 | 7/2006 | Nagel | | |
| 7,127,261 B2 * | 10/2006 | Van Erlach | ................ | 455/456.5 |
| 7,152,047 B1 | 12/2006 | Nagel | | |
| 2002/0117544 A1 * | 8/2002 | Wolf et al. | ................... | 235/383 |
| 2002/0139859 A1 * | 10/2002 | Catan | ........................ | 235/472.02 |
| 2003/0018522 A1 * | 1/2003 | Denimarck et al. | ............ | 705/14 |
| 2003/0195818 A1 * | 10/2003 | Howell et al. | ................... | 705/26 |
| 2004/0079804 A1 * | 4/2004 | Harding et al. | ........... | 235/472.02 |
| 2004/0128555 A1 | 7/2004 | Saitoh et al. | | |

* cited by examiner

*Primary Examiner* — Michael G Lee
*Assistant Examiner* — Kristy A Haupt

(57) ABSTRACT

A method and an apparatus for achieving a tailored content response based upon a product identifier coupled with a user identifier are provided. In one method embodiment, the present invention receives a machine readable indicia wherein at least a first portion of the machine readable indicia pertains to the product identifier and at least a second portion of the machine readable indicia pertains to the user identifier. Next, a product associated with the product identifier is identified in a database, wherein the database is not required to be formatted according to an extrinsic product identification standard. Moreover, a user profile associated with the user identifier is identified, the user profile comprising context information for the user. A tailored content response is then compiled for the device based upon the product and the context information.

22 Claims, 6 Drawing Sheets

METHOD AND APPARATUS FOR ACHIEVING A TAILORED CONTENT RESPONSE BASED UPON A PRODUCT IDENTIFIER COUPLED WITH A USER IDENTIFIER

CROSS REFERENCES TO RELATED APPLICATIONS

This Application is a continuation in part of and claims priority to the co-pending, commonly-owned U.S. patent application Ser. No. 11/047,016, filed Jan. 31, 2005, by N. Lyons et al., entitled "Providing Information Regarding A Product," and hereby incorporated by reference in its entirety.

This Application is a continuation in part of and claims priority to the co-pending, commonly-owned U.S. patent application Ser. No. 11/017,768, filed Dec. 22, 2004, by N. Bhatti et al., entitled "Collection Of Data Associated With An Advertisement," and hereby incorporated by reference in its entirety.

This Application is a continuation in part of and claims priority to the co-pending, commonly-owned U.S. patent application Ser. No. 11/017,772, filed Dec. 22, 2004, by N. Bhatti et al., entitled "Optimizing Retrieval Of Object-Associated Information," and hereby incorporated by reference in its entirety.

This Application is a continuation in part of and claims priority to the co-pending, commonly-owned U.S. patent application Ser. No. 11/047,302, filed Jan. 31, 2005, by N. Lyons et al., entitled "Recording Transactional Information Relating To An Object," and hereby incorporated by reference in its entirety.

TECHNICAL FIELD

The present invention generally relates to product identification. More specifically to a system and method for achieving a tailored content response based upon a product identifier coupled with a user identifier.

BACKGROUND

Various systems use transponders to identify objects from a distance by associating a transponder with the object. Objects may be identified using, for example, either an active transponder or a passive transponder. An active transponder contains its own power source, whereas a passive transponder lacks its own power source. A passive transponder may, for example, obtain power from an electric or magnetic field provided by a reader. One class of transponders includes radio frequency identification (RFID) tags. For example, an RFID tag is programmed with a unique identification code that is used to identify a specific object the tag is attached to, and an RFID tag reader is used to retrieve the code from the tag. Electronic Product Codes (EPC) are also becoming popular, and may include a product class identifier as well as a unique identification code. These EPC codes may be stored in an RFID tag. Other types of systems may use a product class identifier, such as a Uniform Product Code ("UPC") symbol, and a reader, such as a bar code reader, for reading the UPC symbol.

These systems differ in that they use different mediums for storing information about an associated object. For example, an RFID tag may store a code in memory and a UPC symbol may be provided on a printed medium. These systems are similar in that the information stored in the medium may be used to retrieve additional information about the object. For example, a UPC symbol may be scanned and information about the object is retrieved based on the scanned UPC symbol. However, a user interested in obtaining information about the object may have little or no control over the information retrieved. For example, scanning a UPC symbol may only result in retrieving static information about the object, such as all the information about the object stored in the reader system or a connected database.

Static information obtained from conventional transponder systems is of limited use and application. In addition, if the retrieved information is being transmitted over a network, having no control over the data being retrieved may result in long latencies or increased costs if a fee is associated with using the network.

DISCLOSURE OF THE INVENTION

Embodiments of the invention provide a method and an apparatus for achieving a tailored content response based upon a product identifier coupled with a user identifier are provided. In one method embodiment, the present invention receives a machine readable indicia wherein at least a first portion of the machine readable indicia pertains to the product identifier and at least a second portion of the machine readable indicia pertains to the user identifier. Next, a product associated with the product identifier is identified in a database, wherein the database is not required to be formatted according to an extrinsic product identification standard. Moreover, a user profile associated with the user identifier is identified, the user profile comprising context information for the user. A tailored content response is then compiled for the device based upon the product and the context information.

BRIEF DESCRIPTION OF THE DRAWINGS

The accompanying drawings, which are incorporated in and form a part of this application, illustrate embodiments of the present invention, and together with the description, serve to explain the principles of the invention. Unless noted, the drawings referred to this description should be understood as not being drawn to scale.

BEST MODE FOR CARRYING OUT THE INVENTION

Reference will now be made in detail to various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following description of the present invention, numerous specific details are set forth in order to provide a thorough understanding of the present invention. In other instances, well-known methods, procedures, components, and circuits have not been described in detail as not to unnecessarily obscure aspects of the present invention.

Aspects of the present invention may be practiced on a computer system that includes, in general, a processor for processing information and instructions, random access (volatile) memory (RAM) for storing information and instructions, read-only (non-volatile) memory (ROM) for storing static information and instructions, a data storage device such as a magnetic or optical disk and disk drive for storing information and instructions, an optional user output device such as a display device (e.g., a monitor) for displaying information to the computer user, an optional user input device including alphanumeric and function keys (e.g., a keyboard) for communicating information and command selections to the processor, and an optional user input device such as a cursor control device (e.g., a mouse) for communicating user input information and command selections to the processor.

Overview

RFID tags are typically programmed with unique identification codes that identify the object. For example, the unique identification codes may include unique identifiers, which uniquely identify each package of a product. RFID tags use radio frequency technology to transmit information stored in the RFID tags. For example, a RFID tag may include an integrated circuit and an antenna. The RFID tag may include a passive RFID tag (not using an internal power source such as a battery) or an active RFID tag (using an internal power source, such as a battery) may be used.

Figure 1:
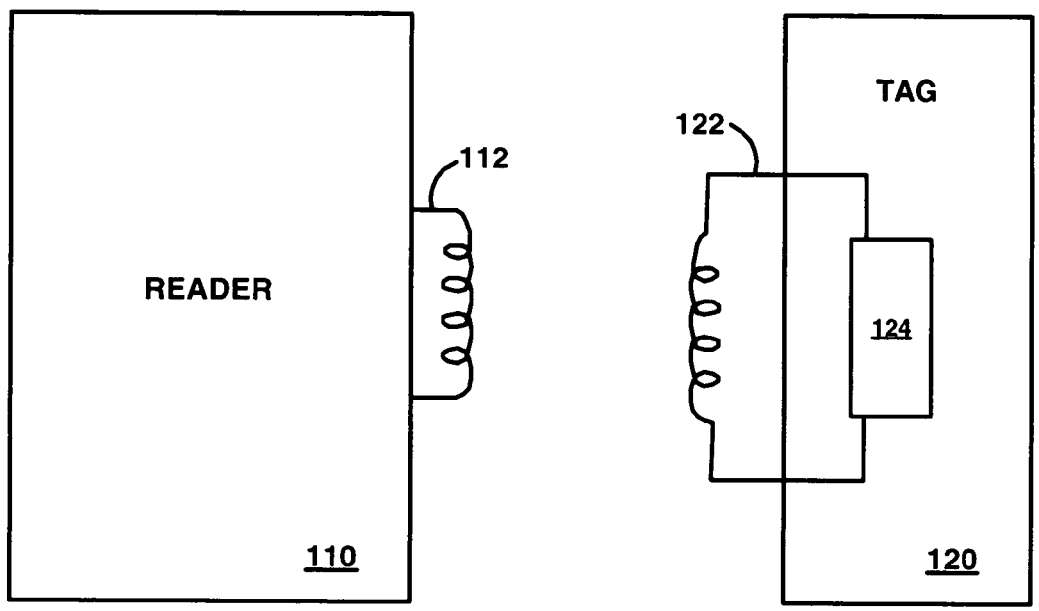
FIG. 1 illustrates a conventional RFID reader and tag in accordance with one embodiment of the present invention.

As shown in FIG. 1, a reader 110 may read a RFID tag 120. The RFID tag 120 and reader 110 system may be used in the embodiments described. A reader 110 may include an inductive element 112 generating a magnetic field that energizes a tag 120. The inductive element 112 may be part of an antenna. The magnetic field induces an energizing signal for powering the tag 120 via the antenna. The RFID tag 120 may include an inductive element 122 and tag electronics 124. When the tag 120 is in proximity of the reader 110, the magnetic field generated by the reader 110 energizes the tag 120 by inducing a voltage across the inductive element 122 and providing power to the tag electronics 124. Information in the tag 120 is sent back to the reader 110 using the tag electronics 124 and the inductive element 122 by alternating the loading of the inductive element 122 in a pattern corresponding to the data being sent to the reader 110. This technique is known as load modulation.

FIG. 1 illustrates a passive RFID tag using load modulation. Other types of passive tag technology may be used. Also, instead of a passive tag, an active RFID tag with a power source, such as a battery, may be used. Also, instead of an RFID tag, any type of medium storing or representing a unique ID, which may be read with some type of reader, may be used. Examples of ID technologies suitable for this purpose include, but are not limited to, one and two dimensional barcodes (such as UPC), active and passive low, medium and high frequency RFID tags (such as EPC, ISO 14443 A+B, ISO 15693 RFID tag families).

Figure 2:
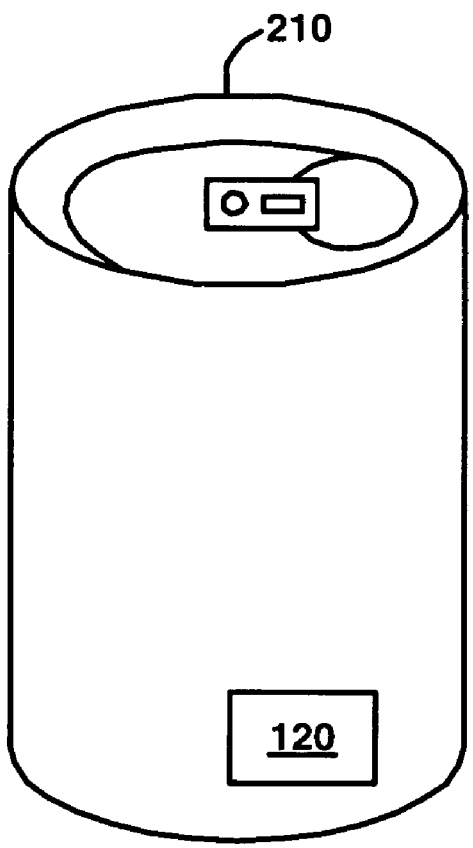
FIG. 2 illustrates an example of a product including an RFID tag in accordance with one embodiment of the present invention.

FIG. 2 illustrates a product 210 including an information tag 120. The information tag 120 may include a bar code, print or a label on the package 210, an embedded microprocessor, a RFID tag or another medium. The information tag 120 may store a unique identifier. If the information tag 120 includes a RFID tag or embedded microprocessor, the unique identifier may be stored alone in the RFID tag or embedded microprocessor. In addition, if the RFID tag includes a sufficient amount of memory, the RFID tag may be configured to store additional information about the product which may be transferred to a data store.

In general, the unique identifier is capable of identifying the product 210 at the item level, e.g., a specific can of cola, at the product level, e.g., a cola product, at the corporate level, e.g., a manufacturer, distributor, importer, wholesaler, retailer, and the like, or at any of the plurality of possible levels in between. Although the product 210 is shown to be a can, such as a cola can, any type of product may be used in accordance with the embodiments described. The product 210 may be of any shape, such as a cube, or any material, such as some type of paper or plastic. In another embodiment, product 210 may be configured to be a package 210 containing any type of product or a plurality of products. Although the information tag 120, as shown, is placed at the bottom of the product 210, this is not a requirement of the system. The information tag 120 may be placed on any part of the product 210 depending on design. In another embodiment, the information tag 120 is placed on the shelf near the product 210 or a plurality of products 210.

Figure 3:
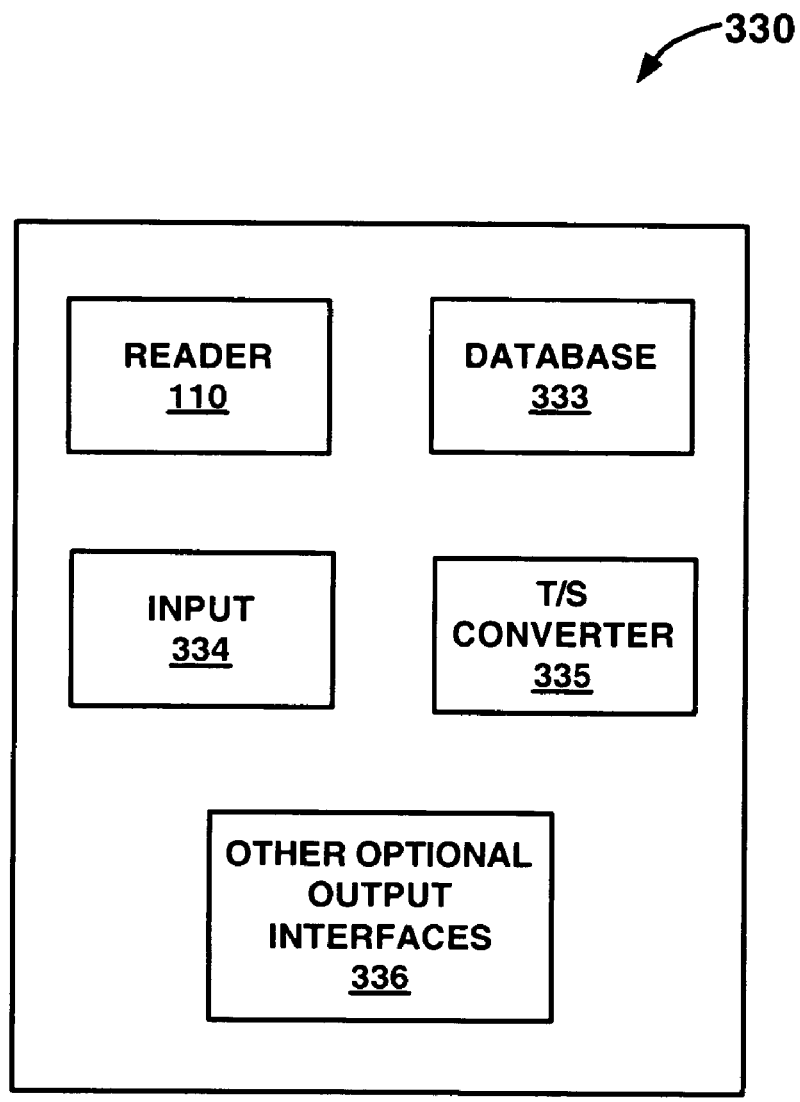
FIG. 3 illustrates an example of a user device usable to provide interactive product information in accordance with one embodiment of the present invention.

With reference now to FIG. 3, a block diagram of an exemplary user device 330 is shown in accordance with an embodiment of the present invention. In general, the user device 330 is a device such as a mobile phone, a personal data assistant ("PDA"), and ipaq, a reading device or other type of computing or communications device. In another embodiment, the user device 330 is an add on component to (or portion of) another device such as a mobile phone, PDA, reading device or other type of computing or communications device. In one embodiment, the hardware and software of the other device may be used to provide or may be augmented to provide the features described herein for device 330.

In one embodiment, the user device 330 includes a reader 110 to read information from the information tag 120, as shown in FIGS. 1 and 2. The user device 330 may also include an input mechanism 334 and a text to speech ("T/S") converter 335. The input mechanism 334 may include any type of input mechanism, such as a keyboard, a mouse or one or more dedicated keys. For example, if the user device 330 is a mobile telephone or PDA, the input mechanism 334 may include a number pad, key pad, or the like. The T/S converter 335 may be used to convert information stored as text to speech to allow the interactive information to be generated as speech. The T/S converter 335 may include any known type of T/S converter.

Another optional output interfaces module 336 may include software and/or hardware to support various types of output. For example, the other optional output interfaces module may support video, Braille or other output modalities.

Figure 5:
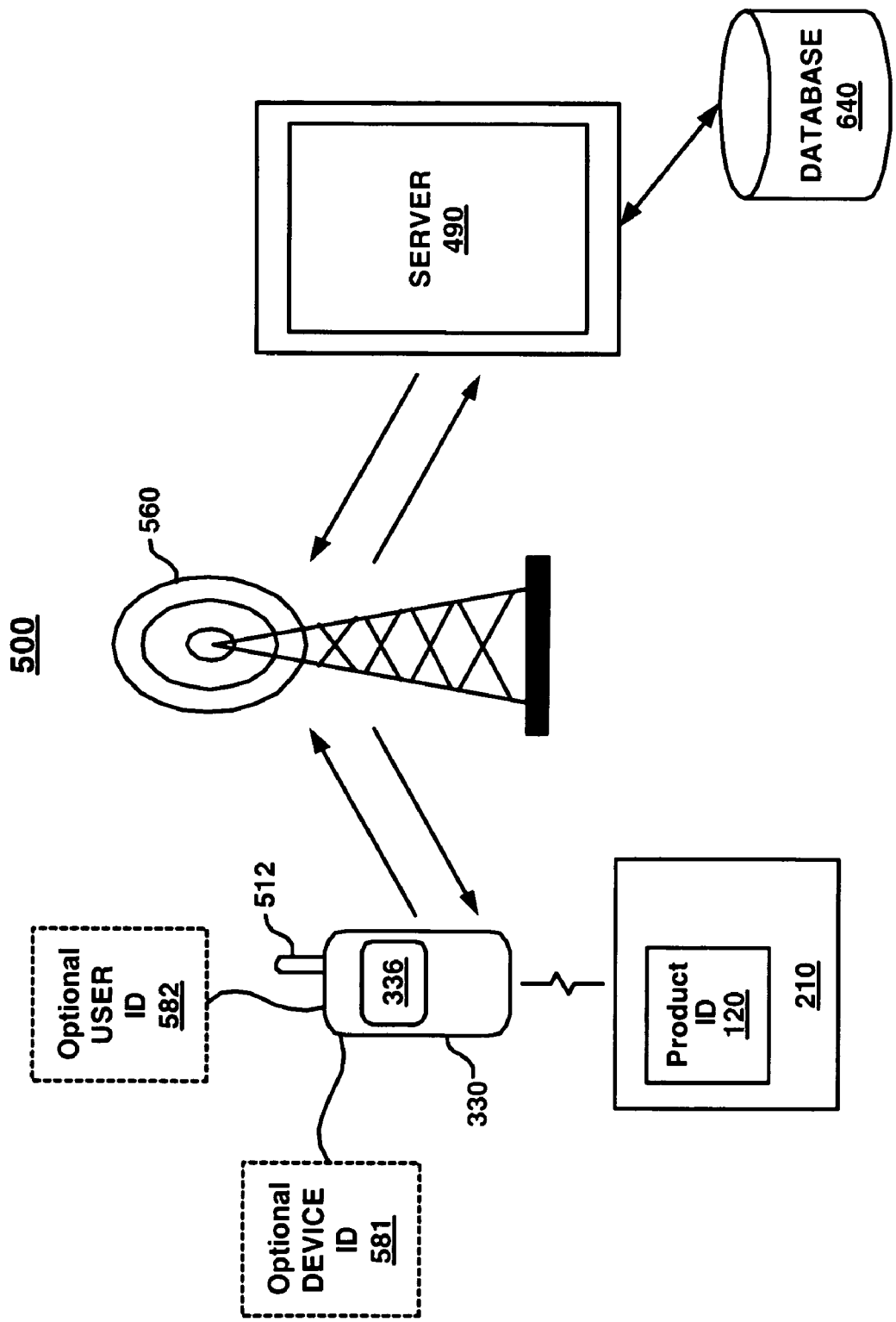
FIG. 5 depicts a system for providing data associated with an product ID in accordance with one embodiment of the present invention.

The user device 330 may also include a database 333. In general, the database 333 includes information such as device identifier information 581 and/or user identifier information 582, as shown in FIG. 5. The device 330 may also include a processor 351 to process information, such as information from the information tag 120, information from the database 333, or information received through a user input mechanism 334. In one embodiment, the user may have a RFID tag embedded in a card that identifies the user. In another embodiment, the user would use the mobile handheld device to identify themselves with a login and password, or other identifying means such as those described herein. Additionally, an RFID tag could be used to identify the device or the device would automatically identify itself or its intrinsic and relevant capabilities (e.g. display size, communication costs, IO abilities, etc).

Operation

Figure 4:
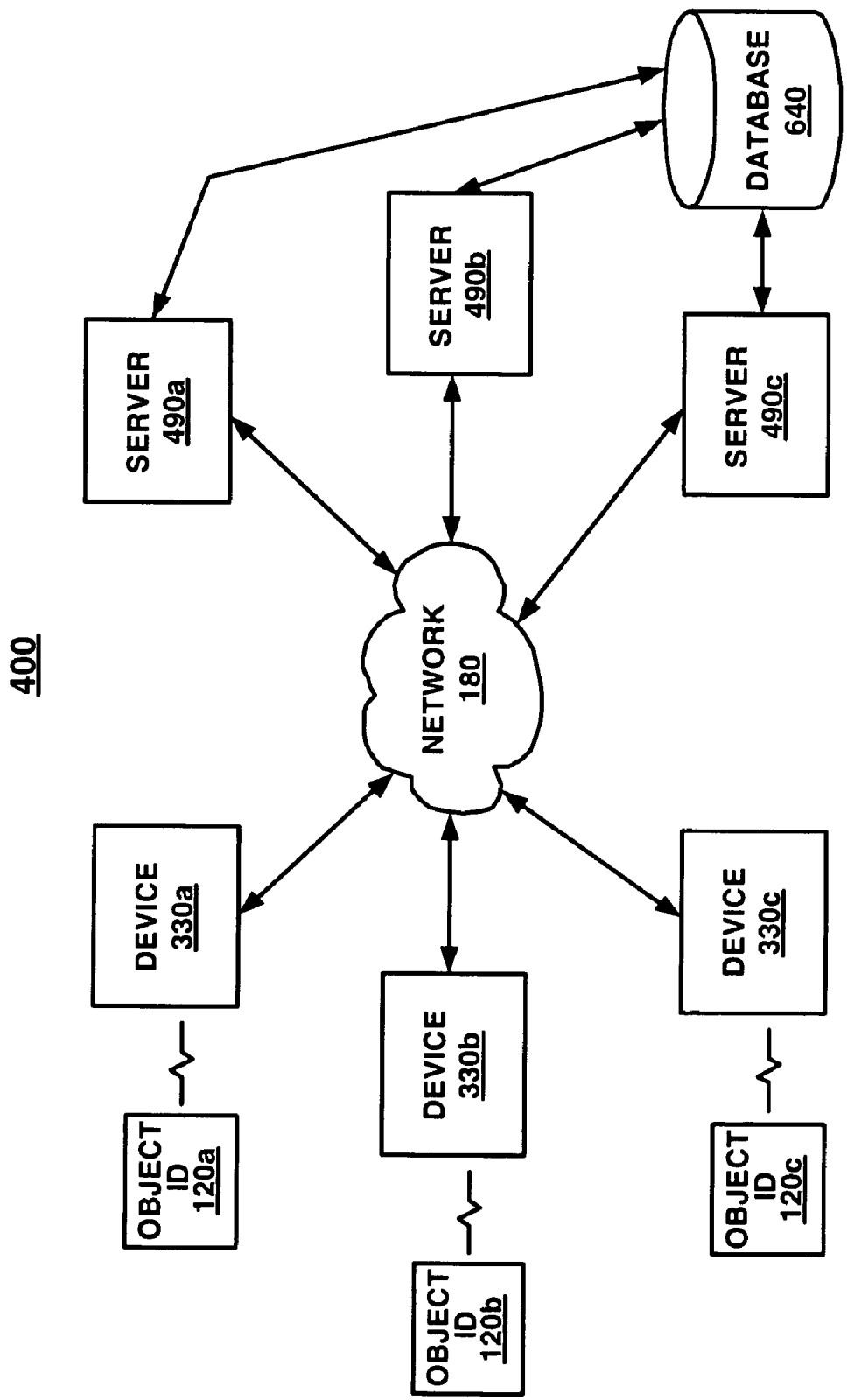
FIG. 4 depicts a general network diagram showing a high-level architecture in accordance with one embodiment of the present invention.

FIG. 4 illustrates a system 400 including a plurality of devices 330, such as 330a, 330b, 330c, and a plurality of servers 490, such as 490a, 490b and 490c connected via a network 480.

The devices 330a-330c are configured to read the product Identifications (product IDs) 120a-120c. For example, the device 330a may read product ID 120a, the device 330b may read product ID 120b, and the device 330c may read product ID 120c. The devices 330a-330c may include conventional readers, such as scanners or an RFID tag reader 110. The devices 330a-330c may also include conventional user devices, such as PDAs (personal digital assistants), mobile phones, laptops, palmtops and other handheld devices equipped with or capable of interacting with readers operable to read an product ID.

An product ID 120a-120c may be read from an RFID tag such as tag 120, label, or other storage medium. In the case of an RFID tag, the product ID 120a-120c is stored in the RFID tag and read from the RFID tag using the device 330. An product ID 120a-120c, such as the product ID 120a, may include any type of machine readable code or indicia. An product ID 120a-120c may include a unique ID for each object or may comprise an ID, such as a UPC symbol or other product class identifier that identifies a class of objects or products.

When an product ID, such as the product ID 120a, is read by a device 330 a machine readable indicia is realized from the object or product identifier 120a. In addition, as described herein, a device identifier 581 and/or user identifier 582 is attached to the machine readable indicia. After combining the information, e.g., the product identifier with the user and/or device identifier, the device 330 will initiate a communication with one or more of the servers 490a-490c via the network 480 for request information associated with the product ID 120a and ultimately the object having the product ID 120a. The retrieved information is transmitted to the device 330a via the network 480 in a format based on the device profile and/or the user profile generated from the device and/or user identifier. Any reasonably suitable information retrieval techniques may be used, including, but not limited to, one or more cache management techniques.

According to one embodiment, the amount of data to be retrieved by one or more of the servers 490a-490c and transmitted to the device 330a is based on one or more optimization parameters associated with the transmission of the data. One or more optimization parameters may be selected by a user, may include default options and other parameters, and may be calculated. Optimization parameters may also be set by one or more content providers, for instance, providers of content on the Internet or other sources of information, or set according to the specifications of a particular user device or one or more backend services, to optimize the transmission of associated data to the device 330a. Examples of optimization parameters include, but are not limited to, bandwidth, available memory capacity of the user device, cost of data transfer, latency of data transfer, user preferences of the amount of data to be received, and other parameters associated with data transfer capabilities of the network. Thus, the total amount of information retrieved by one or more of the servers 490a-490c and transmitted to the device 330a may be optimized for speed, cost, or other factors such as based on the wireless fidelity (Wi-Fi) or general packet radio service (GPRS) connection.

In one embodiment, the amount of associated data, based on one or more optimization parameters, may be determined at the server 490 by identifying a threshold of the one or more optimization parameters and selecting the amount of associated data, such that the threshold is not exceeded. For example, the amount of data transmitted to the device 330a may be controlled to remain below the available memory space of the device 330a.

In addition to or instead of optimization parameters, customization parameters may be used to control the information transmitted to a user. The type of data to be retrieved by one or more of the servers 490a-490c and transmitted to the device 330a may be customized based on a user's request, user provided data, a user's observed behavior, or other customization parameters.

A customization parameter may include any parameter used to customize or tailor the type of information transmitted to a user. Customization parameters may include one or more user-selected parameters based on user preferences or user-selected choices about the types of information to receive. Customization parameters may also include default options and other parameters and may also be calculated. Customization parameters may be derived from observed user behavior, such as observing products selected by the user and observing user responses to queries, which may, for instance, be specific to the user requesting the information. In one example, the observed behavior of a user may indicate that the user has a dog based on a selection of dog food by the user. The observed behavior may also be based on an aggregate of observed behaviors for different users. Customization parameters may operate to enhance the quality and type of information for the user by tailoring the data delivered. In addition, optimization parameters and customization parameters may be determined independently.

Customization parameters may be used to customize any type of information selected and transmitted to a user. As an example of a customization parameter, a user may customize the information to be received based on a personalized preference for obtaining information related to a specific product category. For example, a customization parameter may be a user's preference for organic foods. The device 330a may be used to read an product ID from an RFID tag or other storage medium provided in an object from a grocery store. The server 490a may transmit information to the device 330a for organic produce available from the grocery store.

As another example of a customization parameter, a consumer may have a personalized preference for obtaining information related to a category of auto parts manufactured by a specific auto manufacturer ABC. In this case, the customization parameter may be used by the consumer to customize or tailor the type of information received to include only information pertaining to the desired category of auto parts. For example, by reading an product ID from an RFID tag provided on the packaging of an auto part manufactured by the auto manufacturer ABC, the user may customize the information received by receiving only information pertaining to the desired category of auto parts.

A customization parameter may be used to receive any type of information related to a product category or other information category, for example. As illustrated by the examples discussed above, customization parameters may be used by a user to filter the type of information that is provided by the server 490, based for example on one or more user preferences. Customized information received by the user, based on one or more user's personalized preferences, may include information about any characteristic of a product, such as the available or optional features for a product, a detailed description of each product, and any other type of product information, such as makes, models, types, colors, sizes, shapes, or any other attribute of one or more products within a product category. Product category information may also include information on the materials used to manufacture the products, warranty information, related products, sales, discounts, other price information, etc.

Other categories of information may be customized by a user, including categories of persons, places, or things. Information may also be customized by a user for retrieval in one or more different languages, or other desired formats, including information delivered as text, graphics, etc., for delivery to a user based on a user's personalized preference. A user may also desire to receive customized information, for example for a category of products, based on any other parameter that may be customized, including language, geographic location, etc.

The types of information retrieved by a server 490 from a data storage such as data storage 640 and transmitted to a device 330 may be customized for other factors, user preferences or options. In another example, it may be observed that the user has requested information about a specific stereo product included within a product category offered by a particular company. Thus, only information related to the specific stereo product may be transmitted to the user. Aggregated behavior of different users may also be used to derive customization parameters for a user or group of users.

Predictive techniques, which may be based on observed behavior, may also be used to determine the amount or type of data to be retrieved by a server 490 and transmitted to the device 330*a*. In one respect, the predictive techniques may be used to derive customization parameters. For instance, the authentic or actual behavior of a particular user may be observed, captured, analyzed, and used to retrieve and transmit information to the particular user. In addition, a particular user may have been observed to have used a device 330*a* to read only product IDs associated with auto parts manufactured by a specific auto manufacturing company. This observed behavior may provide a basis for selecting and transmitting object-associated information when the user submits future requests for information.

According to another embodiment, predictions may be based on aggregated data across all users or a subset of similar users. Aggregated data may then be used to determine the amount or type of data to be retrieved by a server 490 and transmitted to a device 330*a*. Predictive techniques may also be used in conjunction with one or more optimization or customization parameters for selecting and transmitting associated data to the device 330*a*.

Referring to FIG. 5, a schematic diagram of a system 500 for providing object-associated information in an interactive setting is illustrated. A device 330, in addition to being operable to perform communication functions, is also operable to read an product ID 120. In this regard, the device 330 comprises an antenna 512 for transmitting a signal to, and receiving a signal from, a tower 560. The device 330 also comprises a screen 336 for displaying information, including data received from the server 490.

The device 330 is an example of a type of device 330 shown in FIG. 3. Although the device 330 is shown in FIG. 5, any other device or reader, including for example a handheld or portable device, a mounted device or reader, or other product ID detection device may be the device 330.

The product ID 120 is read from a storage medium, for instance, an RFID tag, label, etc. as described herein, which may be provided on the object 210 or on the object's packaging. In addition, the product ID 120 may include a unique ID for each object 210. For example, a store typically has several of the same items for sale. Each item or object may include an RFID tag with a unique serial number that uniquely identifies the item from other items. The product ID 120 may also comprise a product class identifier, which may include EPC or UPC codes, or other information.

The object 210 may include a consumer product or any other physical object, article or structure. A consumer product may comprise any product or article which is used in commerce, for example a consumer good or manufactured item. According to one embodiment, a user may obtain data associated with a consumer product, such as location information of the consumer product, manufacturer information associated with the consumer product, cost information of the consumer product, information about related consumer products, or other attributes of the consumer product.

A user may use the device 330 to read the product ID 120. After the device 330 reads the product ID 120, the device 330 may be used to transmit the machine readable indicia (e.g., the product ID 120 in conjunction with a device identifier and/or a user identifier) to the tower 560. The machine readable indicia are then transmitted to a node connected to a network, including, for example, the server 490. The network may include the Internet. Data that is associated with the product ID 120 is then identified in a database 640 by the server 490, formatted and then transmitted to the device 330 via the tower 560.

Data may be transmitted between the device 330 and the server 490 using a HTTP standard protocol. However, the use of the HTTP standard protocol, another standard protocol, or another publicly available and accessible protocol in the transmission of either the product ID 120 or the resulting associated data is not required. For example, a proprietary protocol or non-standard protocol may be used in transmitting the product ID 120 and the resulting associated data and content to a user. Thus, a proprietary server may be used to provide specific content to a user, such as a user of the device 330 shown and described with reference to FIG. 5, without departing from a scope of the system 500.

The backend server, such as the server 490, may be a specific server that has specific content. For example, the server 490 may provide object-associated information about a specific type of brake pad that may be owned by the company that manufactures the specific type of brake pad. Object-associated information may also be retrieved from backend servers owned or operated by other information sources, such as a provider of consumer product information, and other sources.

In addition to identifying data that is associated with the product ID 120 (which may be performed using one or more customization parameters), the server 490 uses at least one other optimization parameter (e.g., the device parameters and/or user parameters) for optimizing the retrieval and transmission of associated data to the device 330. As described above, optimization parameters may be used to control the amount of data transferred to the device 330 based on factors such as cost, latency, device specifications, etc. For example, the device profile may include a minimum of associated data to be received if the user is charged based on the amount of data or time of data transfer for transmitting the associated data to the device 330 from the server 490.

The amount of associated data retrieved may be determined based upon the amount calculated by any of the user, the device 330, and the server 490. For example, a user profile will elect to receive a specific amount of information associated with a brake pad in a store, wherein the brake pad is associated with a specified type of vehicle or auto manufacturer.

In addition, customization parameters may be used to determine the type of information transferred to the device 330. For example, a user profile may have been observed to have requested information associated with a particular make and model of a vehicle, which may be the make and model of the vehicle owned by the user. If the user reads a tag associated with a brake pad, the back end service only transmits information about brake pads for the make and model of the vehicle identified based on the user's observed behavior.

In another example, a customization parameter may be a user's preference for organic foods. The user reads a feature ID from an RFID tag or other storage medium provided in an advertisement for produce from a particular grocery store. The server 490 transmits information to the user for organic produce available from the grocery store. This customization parameter may be derived from a user-selected preference for organic foods or from observed behavior for the user.

As another example of using customization parameters, customization parameters may be based upon one or more observed behaviors of a particular user, as opposed to overt action by a user to select a customization parameter. Customization parameters based on observed behaviors may be used by the server 490 to customize the information retrieved and transmitted to the particular user. For example, a device 330 may be used by a particular user to read a tag associated with a light fixture in an advertisement. An observed preference for that particular user may be that the user shows interest in brushed steel light fixtures. Thus, based on the observed behavior of that particular user, the server 490 may customize the information retrieved and initially transmit information pertaining to brushed steel light fixtures to the user. Thus, customization parameters may be determined based on observed behaviors of a particular user.

Also, customization parameters may be determined based on observed behaviors of a group of users. For example, an aggregated preference for users in the age group of the particular user is that these users prefer brushed steel light fixtures. Thus, the server 490 may initially transmit information pertaining to brushed steel light fixtures to the user. The type of information retrieved by one or more of the servers 490 and transmitted to the device 330, for example, may also be customized according to other factors, user preferences or options.

In another embodiment, one or more customer-relationship management (CRM) techniques, methods, tools, software, etc., may be used to gather, analyze, retrieve and deliver object-associated information to one or more users. CRM may include, for example, any process, method, system, or tool that operates to enhance the amount or type of information that is gathered, processed, and delivered to a user, such as a customer, by acquiring data about the user and thus learning about the user. CRM may thus include any approach or system for information retrieval and delivery that is based on learning, for example using one or more "learning algorithms" to learn about a particular user, such as learning algorithms employed using neural networks. Such learning algorithms may be employed by one or more backend services to enhance the type and quality of information delivered to an individual, based on a profile of the individual, observed buying habits of the individual, changes in actual observed behavior of the individual, or other information gathered that is specific to the particular individual.

CRM techniques may also be based on any other method for gaining information about a particular user. CRM may be used to gather information about customer preferences, buying habits, demographics, age, gender, race religion, creed, marital status, parental status, income level, language preferences, and other information related to an individual. In addition, CRM may be used in enhancing the marketing, sales, and other business activities of a company directed at providing information to one or more consumers or consumer groups.

For example, a provider of information that utilizes the server 490 may utilize one or more CRM approaches to acquire information about a particular user's observed behavior, activity patterns, personalized preferences, or other information pertaining to the behavior and activity of a particular user. CRM methods and tools may also be used to acquire information and learn about the behaviors and activities based on the aggregate activities or behaviors of one or more groups of individuals. Thus, CRM enables a provider of information to retrieve and transmit object-associated information based on information acquired and learned about an individual or a group of individuals. CRM may thus enhance the quality of processes used in delivering information, for example, to consumers or customers seeking information about a type of product or a product category.

The user may use the device 330 to read the product ID 120. The device 330 will then access a database 333 to retrieve a user identifier 582 and/or a device identifier 581 described in more detail herein. The device 330 will then transmit a portion of the product ID 120 and a portion of the device identifier 581 and/or user identifier 582 to the server 490 in the form of machine readable indicia. In one embodiment, as described herein, transmitting the device identifier 581 will provide characteristics of the device such as available storage capacity of the device 330 (among other characteristics described herein), the server 490 will receive the device identifier and recognize the device characteristics. In one embodiment, the server will access database 640 to retrieve the device characteristics. In another embodiment, the device characteristics will be a portion of the device identifier 581 machine readable indicia passed to the server 490. For example, the database 640, (or device identifier 581 machine readable indicia) will tell the server 640 to tailor the response to a substantially limited amount, for instance, 100 kilobytes of data associated with the brake pad having the product ID 120.

In another embodiment, the user may also request additional data that is associated with the brake pad having the product ID 120 by selecting from at least one menu option displayed on the screen 336 of the device 330. By identifying one or more optimization parameters or customization parameters, such as the type or amount of object-associated information that a user desires, the retrieval of object-associated information becomes more efficient and is capable of being under the user's control.

Figure 6:
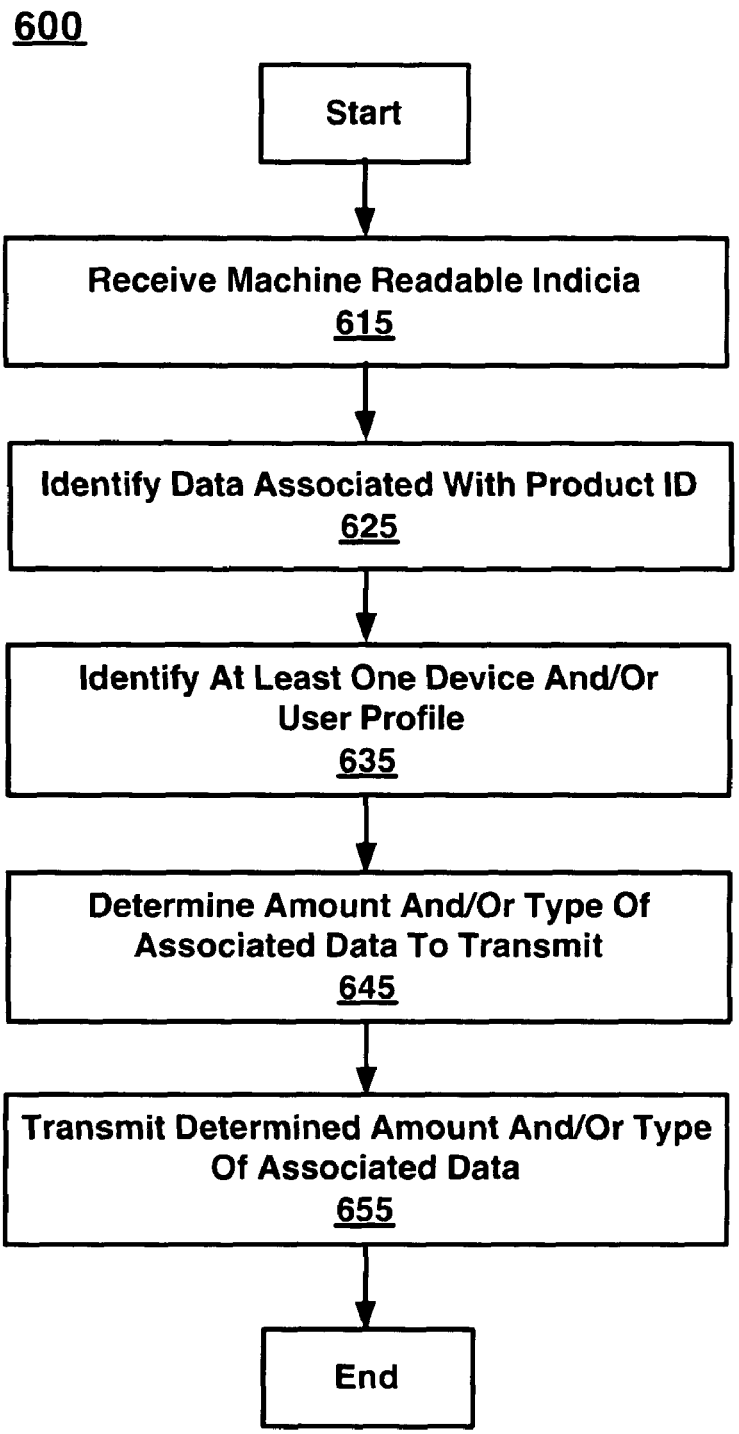
FIG. 6 is a flowchart representing a method of obtaining object-associated information using at least one optimization and/or customization parameter in accordance with one embodiment of the present invention.

Referring now to FIG. 6, a flowchart illustrating a method for achieving a tailored content response based upon a product identifier coupled with a device identifier in accordance with one embodiment. The method 600 is described with respect to the system shown in FIG. 5 by way of example and not of limitation.

Referring now to step 615 of FIG. 6 and to FIG. 5, a server, such as the server 490, receives a machine readable indicia having a first portion pertaining to a product identifier and a second portion pertaining to a device identifier. In one embodiment, the first portion of the machine readable indicia is a portion of the entire machine readable indicia provided by the product identifier. In another embodiment, the first portion of the received machine readable indicia is the entire machine readable indicia provided by the product identifier. In one embodiment, the machine readable indicia is a string of bits, however, it is appreciated that the machine readable indicia may be any language that may be read by a machine.

As described herein, the first portion of the machine readable indicia pertaining to the product identifier 120 is generated from a device scanning a product tag. In one embodiment, the product tag utilizes a universal unique identifier (UUID) such as the 120 of FIG. 2. In another embodiment, the first portion of the machine readable indicia pertains to a (UUID) of a radio frequency identification (RFID) tag 120. In yet another embodiment, the product tag 120 is a barcode, e.g., UPC or the like.

Referring still to step 615, as described herein, the second portion of the machine readable indicia is the device identifier 581. That is, the device 333 couples a portion of machine readable indicia for identifying the device (e.g., device identifier 581) and/or user (e.g., user identifier 582) with at least a portion of the first machine readable indicia pertaining to the product identifier 120 and then provides the collaboration of the machine readable indicia to the server 490. In one embodiment, the device identifier utilizes a UUID as the machine readable indicia.

With reference now to step 625 of FIG. 6 and to FIG. 5, in one embodiment the data associated with the product identifier 120 (or product Identifier) is identified by the server 490. For example, the server 490 will access the database 640 to find the product associated with the product identifier 120. In general, the database 640 is created for associating a machine readable indicia marked item (e.g., a product tag 120 on product 210) with correlated information. For example, the database initially receives the machine readable indicia from the marked item. In one embodiment, the machine readable indicia from the marked item are provided to the database 640 during the construction of the database 640. However, in another embodiment, the indicia of the marked item is provided to a constructed database after the database is in operation, e.g., when a new product is added to an established database of products.

In addition to receiving the machine readable indicia related to the marked item, the database also receives information to be correlated with the machine readable indicia of the marked item. For example, the information correlated to the machine readable indicia of the marked item will relate to the specific item 210, the class of the item 210, the brand of the item 210, the manufacturer of the item 210, the distributor of the item 210, the country of origin of the item 210, the content of the item 210, directions regarding the use of the item 210, advertising related to the item 210, discounts for the item 210, related products to the item 210 and/or any other of a plurality of possible information categories related to the item 210 not mentioned herein for purposes of brevity and clarity.

Once the database has both the machine readable indicia associated with a marked item and the information to be correlated with the machine readable indicia, the information is associated within the database. However, due to the plurality of database preferences and possible related capabilities, the database is capable of being constructed without requiring the database to adhere to extrinsic product identification standard. That is, since the information in the database is correlated to the machine readable indicia marked item, the database can be formatted in a plurality of user definable methods. For example, in one embodiment, the database is organized based on the machine readable indicia marked item. In another embodiment, the database is organized based on the correlated information instead of the machine readable indicia. In yet another embodiment, the database is organized based on the time the information was received by the database.

With reference now to step 635 of FIG. 6 and to FIG. 5, one or more optimization or customization parameters are identified for determining an amount or type of the associated data to transmit to the device 330. For example, in one embodiment a portion of machine readable indicia pertaining to the device identifier 581 is included in the data received at the server 490. In general, the device identifier 581 will allow the server 490 to customize and/or optimize the response to the device 330 based on parameters related to the device 330. For example, as described herein, the parameters of the device may include, but are not limited to, bandwidth, available memory capacity, cost of data transfer, latency of data transfer and graphic user interface (GUI) capability.

In another embodiment a portion of machine readable indicia pertaining to the user identifier 582 is included in the data received at the server 490. In general, the user identifier 582 will allow the server 490 to customize and/or optimize the response to the device 330 based on parameters related to the user or a user's profile. For example, as described herein, the users profile will include user demographic information such as, but not limited to, age, gender, employment, body characteristics, marital status, family characteristics, education, race, religion, creed, purchase history, shopping history, musical taste, skills, hobbies, pleasures, favorites, dislikes, language preference, mode of communication (e.g., sound for the blind, deaf don't want/need audio etc., color blind mappings to colors that they can see), that a user is 'friends' with another user in the system and the like.

Additionally, the user may volunteer the user profile or the user may not volunteer the profile. For example, the user may fill out a questionnaire to establish a profile. However, in another embodiment, the user information does not need to be static information, for example, by tracking user behavior (previous interactions with the system, e.g., past retrievals of information) some aspects of the profile for the current interaction can be dynamically computed. That is, the profile may be learned based on the user identifier 582 and the actions associated therewith, e.g. risk taker, smokes, drives race cars or drives a Volvo, has too much life insurance, really worries about germs, and the like. In other words, the user profile may learn from previous behavior, e.g., someone looked at a Lexus, then a Mercedes, they are a prime target for a BMW ad as it is inferred that they are in the luxury car market.

In another example, a user swipes a number of related products. After they have swiped a conditioner, shampoo, and 'damaged hair' product, the response from the system may become more targeted to the hair type of the hair care products the user has swiped in the past—if they were for damaged hair, for example, the response might include additional information relating to products dealing specifically with damaged hair. In that case, the system inferred that the user is self-selecting or placing themselves into the category "person with damaged hair" without the need to pre-classify them as a member of that demographic group.

In one embodiment, as describe herein, the optimization or customization parameters are identified by the server 490. For example, the server 490 will access the database 640 to find the device associated with the device identifier 581 and/or the user information associated with the user identifier 582. In another embodiment, the second portion of machine readable indicia received at the server 490 will provide the device profile as the device identifier 581 and/or the user information as the user identifier 582 thereby removing the need for the server 490 to access a database for the information.

Referring now to step 645 of FIG. 6 and to FIG. 5, the server 490 determines the amount or type of the associated data to transmit to the device 330 based on the identified optimization or customization parameters of the device, or the profile of the user, or a combination of the parameters of the device and the profile of the user. For example, the response may be based on product information and formatted based on the device characteristics and/or user profile.

With reference now to step 655 of FIG. 6, the determined amount or type of the associated data is transmitted to the device 330. After a user receives the associated data from the server 490, the user may then decide whether to identify other data associated with the same product ID 120. In one embodiment, a user may select additional information from one or more menus of information displayed on the screen 336 of the device 330. A handheld device, such as a PDA, ipaq, or the like, may also display a screen that enables a user to select from one or more menu options. A menu may be displayed on the screen 336 and the user may decide to receive additional data associated with a specific object 210. The menus thus provide dynamic interaction to a user that is context-dependent and product-specific.

Instead of providing only limited information that is static, for instance, in the form of static URLs or coupons, one embodiment provides the capability for dynamic exchange of information associated with the particular product ID 120. For example, one or more menus may be used to navigate between complementary products, for instance, products with complementary features or other related characteristics. Associated data may be retrieved from a network or the server 490, as shown in FIG. 5. According to the flowchart shown in FIG. 6, a user may obtain object-associated information in an interactive setting, and is not limited to retrieving only static information associated with the product ID 120, such as a URL.

Therefore, embodiments provide a method and system for achieving a tailored content response based upon a product identifier coupled with a user identifier. In addition, embodiments further provide the method and system for achieving a tailored content response based upon a product identifier coupled with a user identifier that is automatically tailored based on the profile of the receiving user. In addition, embodiments address content response issues such as user demographic, presentation methods, advertisement openings, and the like to accurately and automatically provide a tailored content response to a user.

Embodiments of the present invention are thus described. While the present invention has been described in particular embodiments, it should be appreciated that the present invention should not be construed as limited by such embodiments, but rather construed according to the following claims.

What is claimed is:

1. A method for achieving a tailored content response based upon a product identifier coupled with a user identifier, said method comprising:

receiving from a handheld portable electronic device a machine readable indicia wherein at least a first portion of said machine readable indicia pertains to said product identifier and at least a second portion of said machine readable indicia pertains to said user identifier, said user identifier uniquely associated with said handheld portable electronic device;

identifying a product in a database based on at least one optimization parameter wherein said product is associated with said product identifier, said database not required to be formatted according to an extrinsic product identification standard;

identifying a user profile based on at least one optimization parameter, wherein said user profile is associated with said user identifier, said user profile comprising context information for said user, wherein said at least one optimization parameter is associated with data transfer capabilities of a network;

identifying a threshold of said at least one optimization parameter;

selecting an amount of data associated with said product and said user profile to be received such that said threshold is not exceeded; and compiling said tailored content response based on said at least one optimization parameter, which is not required to include price information, for said user based upon said product and said context information; and selecting said user profile to be associated with said user identifier by said device automatically utilizing a user identification method selected from the group of identification methods that are received as input at said device including: biometrics, smartcard, selecting a user from a list, password and subscriber identity module (SIM) card.

2. The method as recited in claim 1 further comprising:

accessing said tailored content response at said handled portable electronic device.

3. The method as recited in claim 1 wherein said product identifier comprises:

utilizing a universal unique identifier (UUID) of a tag as a product identifier.

4. The method as recited in claim 1 wherein said receiving the machine readable indicia further comprises:

receiving said machine readable indicia wherein at least a first portion of said machine readable indicia pertains to a universal unique identifier (UUID) of a radio frequency identification (RFID) tag.

5. The method as recited in claim 1 wherein said user identifier comprises:

utilizing a universal unique identifier (UUID) as said user identifier.

6. The method as recited in claim 1 wherein said user profile is configured for:

providing a user demographic selected from a group of user profile information including: age, gender, employment, body characteristics, marital status, family characteristics, education, race, religion, creed, purchase history, shopping history, musical taste, skills, hobbies, pleasures, favorites and dislikes.

7. A computer-usable medium having computer-readable program code stored thereon for causing a computer system to perform a method for achieving a tailored content response based upon a product identifier coupled with a user identifier, said method comprising:

receiving from a handheld portable electronic device a machine readable indicia wherein at least a first portion of said machine readable indicia pertains to said product identifier and at least a second portion of said machine readable indicia pertains to said user identifier, said user identifier uniquely associated with said handheld portable electronic device;

identifying a product in a first database based on at least one optimization parameter wherein said product is associated with said product identifier, said first database not required to be formatted according to an extrinsic product identification standard, wherein said at least one optimization parameter is associated with data transfer capabilities of a network;

identifying a user profile in a second database based on at least one optimization parameter wherein said user profile is associated with said user identifier, said user profile comprising context information for said user;

identifying a threshold of said at least one optimization parameter;

selecting an amount of data associated with said product and said user profile to be received such that said threshold is not exceeded; and compiling said tailored content response based on said at least one optimization parameter, which is not required to include price information, for said user based upon said product and said context information; and selecting said user profile to be associated with said user identifier by said device automatically utilizing a user identification method selected from the group of identification methods that are received as input at said device including: biometrics, smartcard, selecting a user from a list, password and subscriber identity module (SIM) card.

8. The computer-usable medium of claim 7, wherein said method further comprises further comprising:
accessing said tailored content response at said handled portable electronic device.

9. The computer-usable medium of claim 7, wherein said method further comprises:
utilizing a universal unique identifier (UUID) of a tag as a product identifier.

10. The computer-usable medium of claim 7 wherein said receiving the machine readable indicia further comprises:
receiving said machine readable indicia wherein at least a first portion of said machine readable indicia pertains to a universal unique identifier (UUID) of a radio frequency identification (RFID) tag.

11. The computer-usable medium of claim 7, wherein said method further comprises:
utilizing a universal unique identifier (UUID) as said user identifier.

12. The computer-usable medium of claim 7, wherein said method further comprises:
providing a user demographic selected from a group of user profile information including: age, gender, employment, body characteristics, marital status, family characteristics, education, race, religion, creed, purchase history, shopping history, musical taste, skills, hobbies, pleasures, favorites and dislikes.

13. A method for requesting a tailored content response based on a product identifier coupled with a user identifier, said method comprising:
receiving from a handheld portable electronic device a first machine readable indicia pertaining to said product identifier;
coupling at least a portion of said first machine readable indicia pertaining to said product identifier with at least a portion of a second machine readable indicia pertaining to said user identifier, said user identifier uniquely associated with said handheld portable electronic device;
providing said coupling of said machine readable indicia to a server; and
receiving a tailored content response, which is not required to include price information, from said server;
receiving said tailored content response from said server, said tailored content response based on a product information and based on at least one optimization parameter coupled with said portion of said first machine readable indicia pertaining to said product identifier and tailored to a user based on said portion of said second machine readable indicia pertaining to said user identifier associated with said at least one optimization parameter, said at least one optimization parameter being associated with data transfer capabilities of a network, wherein said receiving said tailored content response comprises:
identifying a threshold of at least one optimization parameter; and
selecting an amount of data associated with said product and said user profile to be received such that said threshold is not exceeded;
associating a user identifier with a user profile;
storing at least one user profile on a device; and
selecting said user profile to be associated with said user identifier by said device automatically utilizing a user identification method selected from the group of identification methods that are received as input into said device including: biometrics, smartcard, selecting a user from a list, password and subscriber identity module (SIM) card.

14. The method of claim 13, wherein said method further comprises:
utilizing a universal unique identifier (UUID) of a tag as a product identifier.

15. The method of claim 13 wherein said receiving the machine readable indicia further comprises:
receiving said machine readable indicia wherein at least a first portion of said machine readable indicia pertains to a universal unique identifier (UUID) of a radio frequency identification (RFID) tag.

16. The method of claim 13 wherein said user identifier comprises:
utilizing a universal unique identifier (UUID) as said user identifier.

17. The method of claim 13, wherein said method further comprises:
providing a user demographic selected from a group of user profile information including: age, gender, employment, body characteristics, marital status, family characteristics, education, race, religion, creed, purchase history, shopping history, musical taste, skills, hobbies, pleasures, favorites and dislikes.

18. A tailored content response requestor for requesting a response based on a product identifier coupled with a user identifier, said tailored content response requestor comprising:
a processor for executing instructions;
a machine readable indicia receiver configured for receiving a first machine readable indicia pertaining to said product identifier from a handheld portable electronic device;
a combiner configured for combining at least a portion of said first machine readable indicia pertaining to said product identifier with at least a portion of a second machine readable indicia pertaining to said user identifier, said user identifier uniquely associated with said handheld portable electronic device;
a transceiver configured for providing said coupling of said machine readable indicia to a server; and
a response interface configured for receiving a tailored content response, which is not required to include price information, from said server, wherein said receiving comprises:
identifying a threshold of at least one optimization parameter; and selecting an amount of data associated with said product and said user profile to be received such that said threshold is not exceeded;

wherein said tailored content response is based on a product information coupled with said portion of said first machine readable indicia pertaining to said product identifier and based on at least one optimization parameter, and tailored to a user based on said portion of said second machine readable indicia pertaining to said user identifier associated with said at least one optimization parameter, said at least one optimization parameter being associated with data transfer capabilities of a network; and wherein said tailored content response requestor is configured for associating a user identifier with a user profile; storing at least one user profile on a device; and selecting said user profile to be associated with said user identifier by said device automatically utilizing a user identification method selected from the group of identification methods that are received as input into said device including: biometrics, smartcard, selecting a user from a list, password and subscriber identity module (SIM) card.

19. The tailored content response requestor of claim 18 wherein said product identifier utilizes a universal unique identifier (UUID) of a tag as said product identifier.

20. The tailored content response requestor of claim 18 wherein at least a first portion of said machine readable indicia pertains to a universal unique identifier (UUID) of a radio frequency identification (RFID) tag.

21. The tailored content response requestor of claim 18 wherein said user identifier utilizes a universal unique identifier (UUID) of said user as said user identifier.

22. The tailored content response requestor of claim 18, wherein said user profile is further configured for:

providing a user demographic selected from a group of user profile information including: age, gender, employment, body characteristics, marital status, family characteristics, education, race, religion, creed, purchase history, shopping history, musical taste, skills, hobbies, pleasures, favorites and dislikes.

* * * * *

UNITED STATES PATENT AND TRADEMARK OFFICE
CERTIFICATE OF CORRECTION

PATENT NO. : 7,934,658 B1
APPLICATION NO. : 11/144875
DATED : May 3, 2011
INVENTOR(S) : Nina Trappe Bhatti It is certified that error appears in the above-identified patent and that said Letters Patent is hereby corrected as shown below:

In column 15, line 24, in Claim 8, delete "further comprises further comprising:" and insert -- further comprises: --, therefor.

Signed and Sealed this
Twentieth Day of December, 2011

David J. Kappos
*Director of the United States Patent and Trademark Office*